United States Patent [19]

Pyhälammi

[11] Patent Number: 5,237,561
[45] Date of Patent: Aug. 17, 1993

[54] DIGITAL DATA TRANSMISSION SYSTEM
[75] Inventor: Seppo Pyhälammi, Helsinki, Finland
[73] Assignee: Nokia Data Systems OY, Helsinki, Finland
[21] Appl. No.: 640,297
[22] PCT Filed: Sep. 28, 1990
[86] PCT No.: PCT/FI90/00233
§ 371 Date: Apr. 5, 1991
§ 102(e) Date: Apr. 5, 1991
[87] PCT Pub. No.: WO91/05425
PCT Pub. Date: Apr. 18, 1991
[30] Foreign Application Priority Data
Oct. 5, 1989 [FI] Finland ................................. 894726
[51] Int. Cl.⁵ .......................................... H04L 12/26
[52] U.S. Cl. ..................................... 370/29; 370/112; 375/8
[58] Field of Search ............... 370/94.1, 15, 60, 110.1, 370/17, 16.5, 23, 24, 26, 29, 112; 375/8

[56] References Cited

U.S. PATENT DOCUMENTS

| Re. 31,182 | 3/1983 | Proger ..................... 370/60 |
|---|---|---|
| 4,239,934 | 12/1980 | Andren et al. ............... 370/29 |
| 4,486,878 | 12/1984 | Havermans ................. 370/94.1 |
| 4,750,169 | 6/1988 | Carse et al. ................ 370/110.1 |
| 4,751,510 | 7/1988 | de Saint Michel ........... 370/17 |
| 4,764,939 | 8/1988 | Rogers ..................... 370/29 |
| 4,787,081 | 11/1988 | Waters et al. .............. 370/85.1 |
| 4,855,999 | 8/1989 | Chao ........................ 370/112 |
| 4,893,340 | 1/1990 | Lubarsky et al. ........... 370/112 |
| 4,896,319 | 1/1990 | Lidinsky et al. ............ 370/94.1 |
| 4,914,688 | 4/1990 | Kobayashi et al. .......... 375/8 |

FOREIGN PATENT DOCUMENTS 0368055 5/1990 European Pat. Off. .
0381387 8/1990 European Pat. Off. .
WO90/09712 8/1990 PCT Int'l Appl. .

OTHER PUBLICATIONS

Centralized Control System of Network Information, Fujitsu K.K. and Osamu Kotanino, 1984, vol. 9, No. 39 (E-297).

Primary Examiner—Douglas W. Olms
Assistant Examiner—Melvin Marcelo
Attorney, Agent, or Firm—Finnegan, Henderson, Farabow, Garrett and Dunner

[57] ABSTRACT

A digital data transmission system comprising a data transmission network formed by several node stations (A1-A4) and interconnecting high-speed trunk lines (1-5). Each node station comprises several low-speed parallel subscriber interfaces controlled by a network management system (6), subscriber stations (B1-B5) being connectable to the subscriber interfaces either directly or through a serial modem link (10-13), depending on the distance. The network management can be extended up to the subscriber stations so that said modem link (10-13) transfers all signals of the parallel subscriber interface in serial form in both directions, forming, at the end close to the subscriber station (B2-B5), a parallel slave interface corresponding to the subscriber interface.

8 Claims, 3 Drawing Sheets

DIGITAL DATA TRANSMISSION SYSTEM

BACKGROUND OF THE INVENTION

1. Field of Invention

The invention relates to a digital data transmission system comprising a data transmission network formed by several node stations and interconnecting high-speed trunk lines, each node station comprising several low-speed parallel subscriber interfaces controlled by a network management system, whereby subscriber stations are connectable to the subscriber interfaces either directly or through a serial modem link, depending on the distance.

2. Discussion of Related Art

Developments in technology are rapidly leading to digital telecommunication networks. In Europe, standards have been defined for telephone network facilities to ensure the compatibility of the devices of different manufacturers. These standards concern frame structures used in multiplexing and electric interfaces of the systems and facilities. They are based on 2M basic multiplexing the speech channels of which are 64 kbit/s digital channels to be multiplexed to the frame structure in a predetermined standard way. Thirty time slots of the frame structure are reserved for the speech channels and two for other data transmission purposes and synchronization. These devices are typically used to establish connections between exchanges.

As data transmission has become more general, speech and data have began to be transmitted through the same system. Different manufacturers have developed various interface units to provide a data link to a telecommunication network. Since the basic rate in speech multiplexing is 64 kbit/s and the typical data transmission rates are 1,200, 2,400, 4,800, 9,600 and 1,9200 bit/s, it has become necessary to develop a certain subchannelling by means of which a single 64 k channel is provided with several data transmission channels. For this channelling a number of international standards have been introduced, such as the X.50, X.58 and V.110 specifications. The data transmission interface also uses specific standards, the most widely used being the V.24/V.28 specification.

Rapid increase in the amount of data transferred through a telecommunications network has made it economically feasible to construct an independent network solely for data transmission purposes to serve a city or for national service systems, for instance. This kind of network aims mainly at satisfying the need of fixed data transmission connections, but these typically have to be altered frequently (such as changes of transmission rate). It has, in fact, been estimated that alterations are required in a fixed data transmission connection about once in two years.

When the number of fixed connections increase up to a certain limit, the construction and alterations of the connections become too laborious. Network structures enabling flexible establishment of connections between two points have been developed. For this purpose, the network has to be provided with cross-connection means, which switch the channels of the standard frame in a desired manner, and network management facilities control the switching operations of the network and, e.g., changes of transmission rate. In this way very large networks can be formed and nevertheless maintain the manageability of the network.

Since standardization has not concerned the network management, different manufacturers have their own specific systems. The network can be controlled from one or more points. In general, the network management system is able to monitor and control also the individual parallel subscriber interfaces of the nodes which connect the subscriber devices to the network, and, as a consequence, alter the interface configuration, transmission rate or various signal delays in a required manner. When a subscriber device is connected directly to a subscriber interface, the network can be monitored and controlled completely up to the subscriber devices.

In many cases, particularly with services supplied by a telecom office, the node of the network, comprising the cross-connection means, multiplexing means and subscriber interfaces, is located in the premises of the office in a centralized manner while the subscriber facilities are located in the customers' premises within a radius of a few kilometers from the node station. A serial transmission link is thereby established between the subscriber interface and the subscriber device by means of modems, which provides relatively long transmission distances. As the length of the link is usually only a few kilometers, relatively simple baseband modems can be used.

A problem with a modem link is how to bring it under the control of the network management system. Even though the network management system in its present form is able to control the subscriber interface, this is of no use if the system is not able to affect the configuration of the modem link, such as the transmission rate. Centralized supervision of the condition of the modem link is not possible either.

The problem is further aggravated by the great variety of digital networks and different management systems used by different manufacturers and in different networks, as there exists no standards. In most cases, modems have different manufacturers than the other network facilities, and the modem manufacturers have to match their modems with the different network management systems. This is, of course, possible but uneconomical from the viewpoint of the modem manufacturers on account of the resultant small production series and the great number of different models. On the other hand, the manufacturer of the data transmission network has to provide the network management system with programs supporting the modems.

The connection of modems to standard interfaces and network management systems of various manufacturers is equally problematic in packet switched networks.

SUMMARY OF INVENTION

The object of the present invention is to provide a digital data transmission system in which the modem link between the subscriber interface and the subscriber device is under the control of the network management system without having to use substantially different modems in different networks or complicated modem control programs in the network management system.

This is achieved by means of a data transmission system of the type described above, which according to the invention is characterized in that said modem link transfers all data, control and timing signals of the parallel subscriber interface in serial form in both directions, forming a parallel slave interface corresponding to the subscriber interface at the end close to the subscriber station, the states of the signals of the slave interface following the states of the signals of the subscriber interface and the slave interface being directly controllable by the network management system through the subscriber interface.

The basic idea of the invention is that all the states of the signals of the subscriber interface are transferred as such by the modem link in both directions, so that the subscriber interface can be effectively "transferred" or "stretched" up to the subscriber station, whereby the control of the network management system can be automatically extended up to the subscriber station. The invention enables the subscriber interface to be connected to the subscriber device via the modem link in exactly the same way as in cases where a parallel subscriber interface and a subscriber device are interconnected by a suitable multiwire voltage connecting cable without an intermediate subscriber network, whereby an arbitrary digital data communication system is capable of monitoring and controlling the slave interface at the end of the modem link and an associated subscriber device as if it were directly monitoring the subscriber interface and the associated subscriber device.

The modems embodying the invention are suited for various data transmission systems and network management systems irrespective of the manufacturer of the digital network. On the other hand, the network management system need not be provided with separate monitoring buses from the modems to the control computer nor a control program for the control of the modems.

In the preferred embodiment of the invention the modem link, however, comprises line testing means to monitor the condition of the modem link and means for giving alarm in the event of line failure.

The invention will now be described in greater detail by means of embodiments with reference to the attached drawings.

DETAILED DESCRIPTION OF PREFERRED EMBODIMENT

Figure 1:
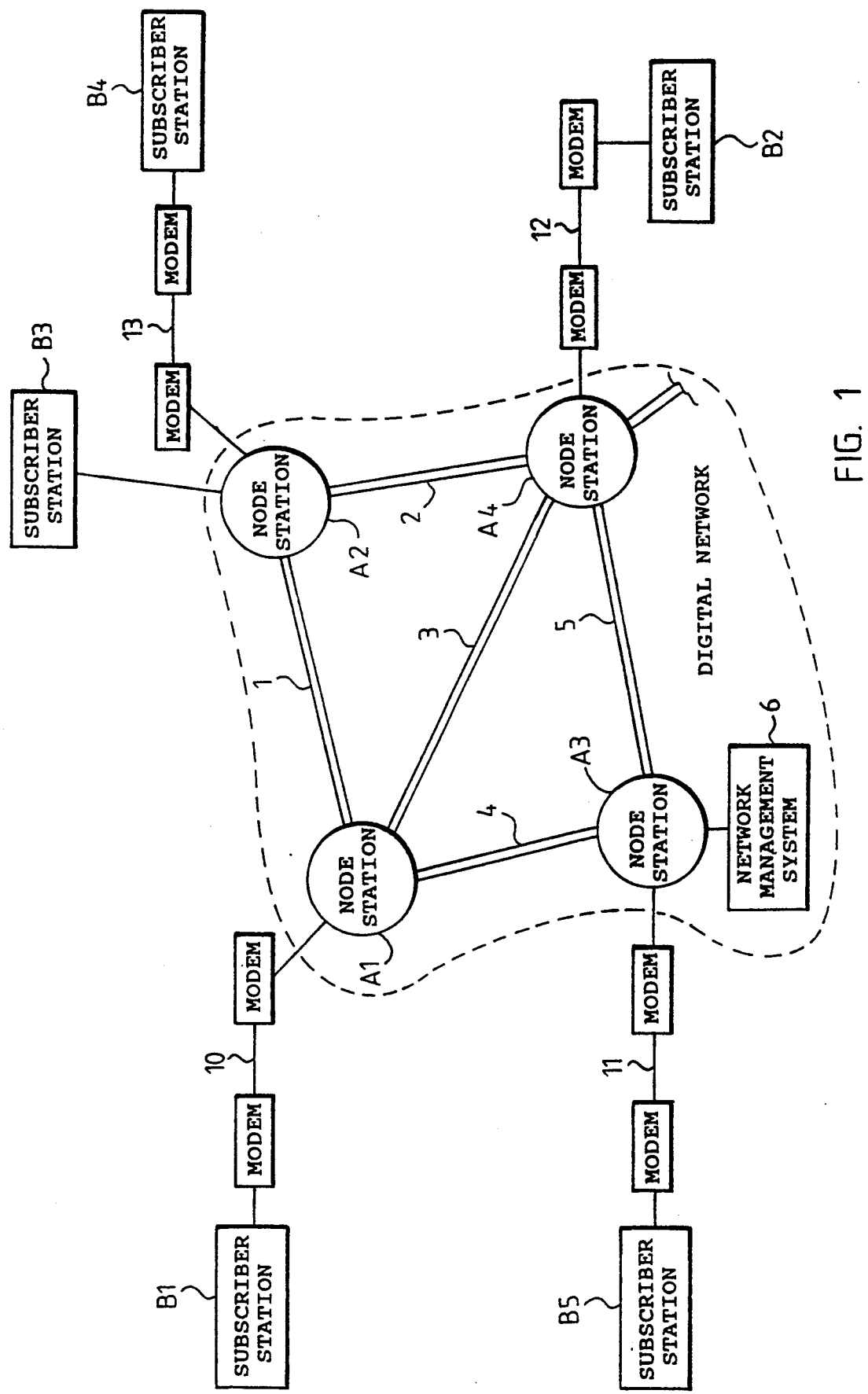
FIG. 1 illustrates schematically a digital transmission system according to the invention.

FIG. 1 shows a digital data transmission system comprising a digital data transmission network formed by a number of node stations A1-A4 and interconnecting trunk lines 1-5. Each node station A1-A4 is interconnected with subscriber facilities or terminal facilities through a low-speed parallel standard interface either directly, such as the subscriber device B3 to the node station A2, or through a serial modem link, such as the subscriber devices B1, B2, B4 and B5 through the corresponding modem links 10, 11, 12, and 13 to node stations A1, A2, A3 and A4. Furthermore, the data transmission network comprises at least one network management computer 6 which monitors and controls the operation of the network and is capable of configuring and supervising said subscriber interfaces.

Since the invention is concerned primarily with the subscriber interface of the data transmission network and the modem link between the subscriber interface and the subscriber device, it is suitable for all network types in which said modem link is to be controlled by the network management system. The network may be time-division multiplexed (TDM) or packet switched, and it can be formed by fixed connections or contain cross-connection means which allow unlimited establishment of connections between different subscriber devices.

The most typical network structure is, however, a time-division switched network in which the transmission rate of the trunk lines 1 through 5 is 2,048 kbit/s (E1 standard) or 1,544 kbit/s (USA T1 standard). The trunk lines may also have unequal rates, such as 64 kbit/s and 2,048 kbit/s. A few network solutions of this type and apparatuses used in them are described in The Dynamics of Private Wire Networks, A. M. Henderson, *Communication and Broadcasting*, Number 29, p. 31-39. The invention can be applied e.g. in networks described in this article.

The subscriber interface is typically a V.24/V.28, V.24/V.35 or V.24/V.11 interface and its rates are typically 300, 1,200, 2,400, 4,800, 9,600 or 19,200 bit/s.

Figure 2:
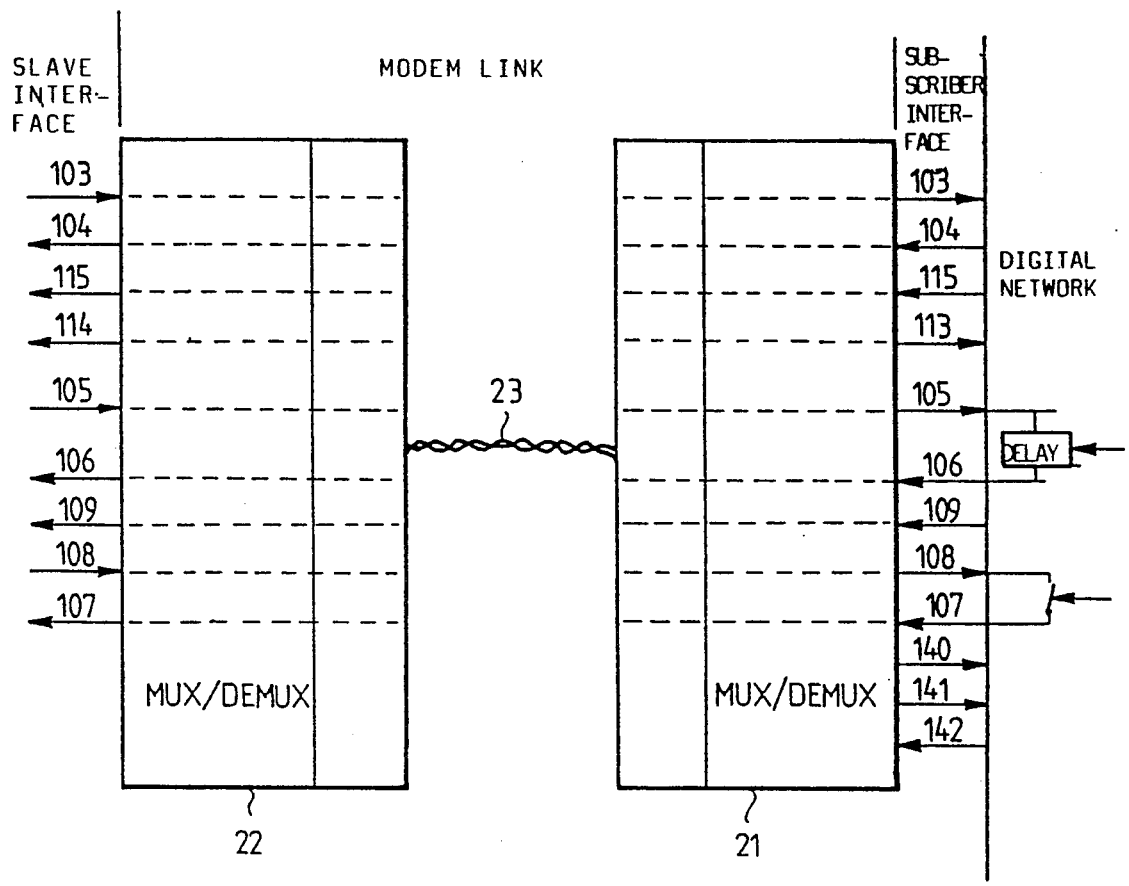
FIG. 2 shows diagrammatically a subscriber interface of a digital network and a modem link and slave interface of the invention.

FIG. 2 illustrates a modem link according to the invention for a subscriber interface. The states of all parallel data, control and timing signals of the subscriber interface of the digital transmission network are transferred by means of the modem link in both directions. For this purpose, the subscriber interface is connected to a modem unit 21 of the invention which comprises a built-in multiplexing and serial transmission unit which converts the data and control signals of the subscriber interface e.g. by time-division multiplexing into a serial signal which is transmitted over a transmission channel 23, such as a twisted pair line or an optical fibre, to another similar modem unit 22. The multiplexing unit of the modem unit converts the received serial signal back into parallel signals which are applied to the subscriber interface. The modem unit 22 similarly processes the signals of the subscriber device. In this way the subscriber modem unit 22 forms a parallel slave interface, the signal states of which follow the signal states of the subscriber interface of the node on real time basis.

When the digital transmission network sets the clock and control signals of the subscriber interface to a predetermined state, they appear as such in the slave interface. Equivalently, the states of the signals of the subscriber devices are transferred in the other direction. Therefore the modem need not be modified when the data or clock signal rate is changed, when shifting from synchronous to asynchronous transmission or vice versa, from half-duplex to duplex transmission or vice versa and when altering various signal delays or controls.

Figure 4:
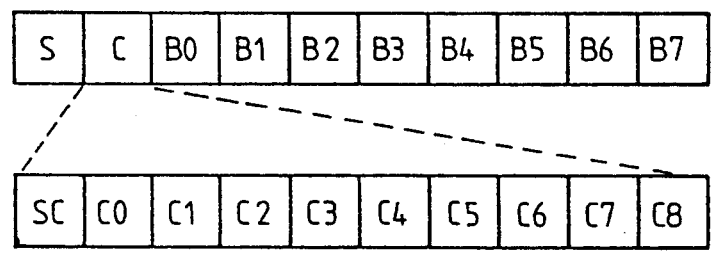
FIG. 4 illustrates the frame structure of a serial signal of the invention.
Figure 3:
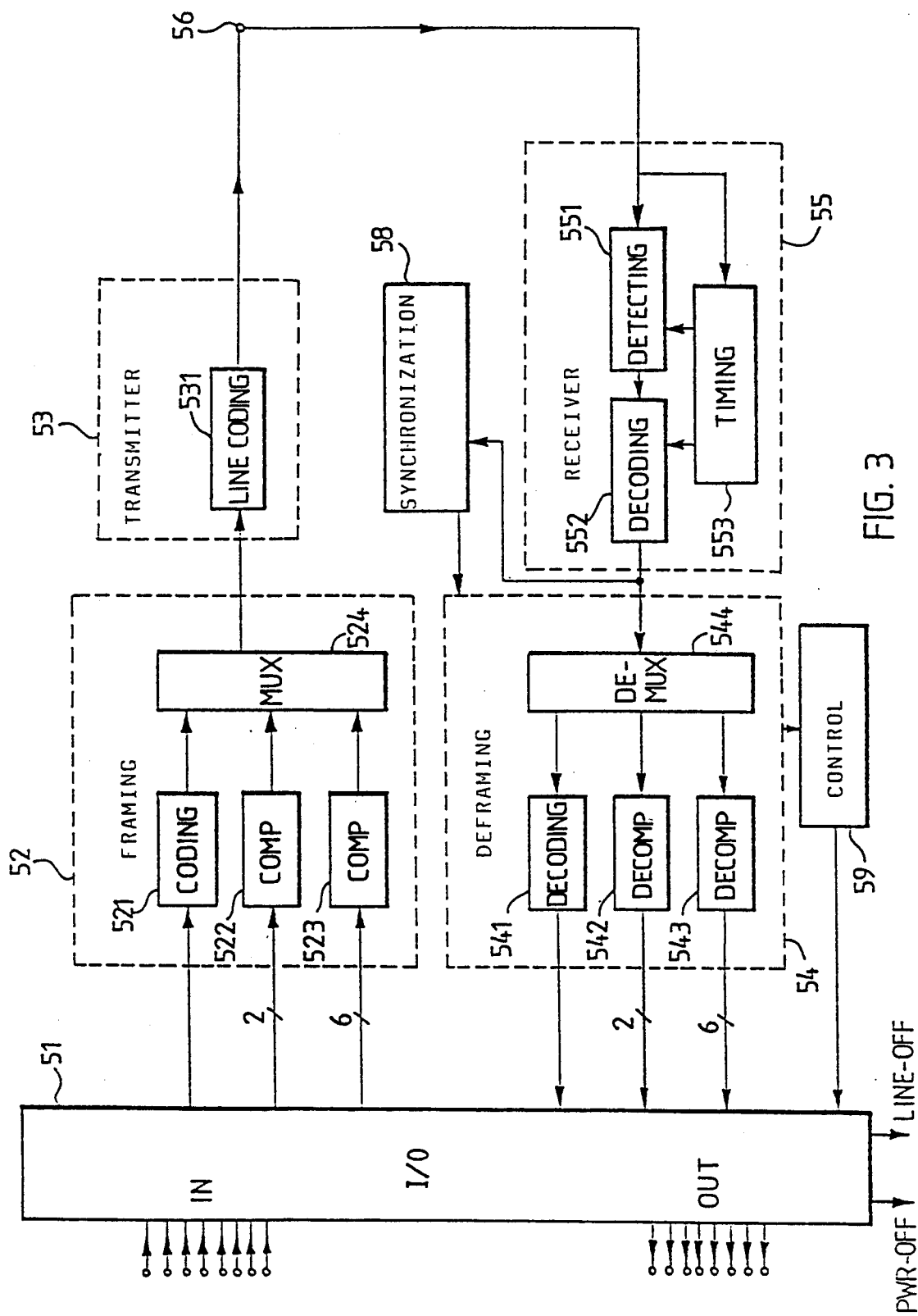
FIG. 3 is a block diagram of the multiplexing and serial transmission unit of a modem of the invention.

FIG. 3, which shows a more detailed block diagram of the multiplexing and serial transmission unit for the modems of the invention, will now be referred to. The unit comprises a multiplexing circuitry 52 and a demultiplexing circuitry 54. The multiplexing circuitry 52 comprises one data input, two parallel clock inputs and six parallel control inputs. The demultiplexing circuitry 54 comprises a corresponding number of parallel data, clock and control outputs. A data signal applied to the multiplexing circuitry 52 is coded in a coding unit 521 before being applied to a multiplexer 524. Two clock signals and six control signals to be applied to the multiplexing circuitry 52 are compressed in time with respect to the data signal in blocks 522 and 523, respectively, taking into account their information content and transmission rate requirement. Output signals from the blocks 521, 522 and 523 are applied to the multiplexer 524, which converts the parallel signals into serial form by conventional time division multiplexing. The multiplexer may form the frame of FIG. 4, for instance. The frame comprises a synchronizing bit S, time internals B0 ... B7 for transferring data and clocks, and a lower-level time interval C for transferring slower signals. The lower-level time interval C further comprises a lower-level synchronizing bit SC and time intervals C0 ... C8 for transferring slow control signals and line test signals.

The serial output signal of the multiplexer 524 is applied to a transmitter 53 which subjects the serial signal to line coding in a block 531. The transmitter may be e.g. a baseband modem or an optical transmitter. The output signal of the transmitter 53 is applied to a line 56.

A serial signal from the line 56 is received at a receiver 55 which contains detection 551 of the received signal, decoding 552 and timing 553 of the reception. The output signal of the receiver 55 is applied to the demultiplexing circuitry 54, in which the multiplexer 544 demultiplexes the frame of the serial signal and produces parallel data, clock and control signals. In blocks 541, 542 and 543, these signals are subjected to operations opposite to those performed by the blocks 521, 522 and 523. The modem unit 21 or 22 preferably further comprises an I/O circuit 51 by means of which the inputs of the multiplexing circuitry 52 and the outputs of the demultiplexing means 54 are adopted electrically to the subscriber or slave interface.

The condition of the line and the possible failure of the subscriber device can be monitored by monitoring the signal states to be transferred from the slave interface over the modem link.

For example, the signal 108 is typically constantly in the ON state. If only the state of this signal changes, it can be judged that the failure is in the subscriber device, for example, the subscriber device has been switched off or the cable of the slave interface and the subscriber interface is loose.

If the subscriber connection is interrupted e.g. when the line is broken or the power supply to the modem at the end of the subscriber device is disconnected, the signals of the subscriber interface change abruptly, for example, the clock signals disappear and the fault can be detected.

If the network management system controlling the network does not sufficiently support the control of the signals to enable desired monitoring, separate alarm signals can be provided in the subscriber interface.

In the preferred embodiment of the invention, the modem link is also monitored for its condition, in addition to which it can be monitored whether the power supply to the modem 22 at the end of the subscriber device is switched off. The line test is preferably carried out by locating test data in one of the lower-level time intervals C0 ... C8 in the modem unit 21. The test data is transmitted to the subscriber modem unit 22, which in turn returns the test data by relocating it in the signal frame to be sent. A control block 59 in the modem unit 21 observes whether the test data is received back within a predetermined period of time from the transmission. If no test data is received, the control block 59 gives an alarm by applying a LINE-OFF signal through the I/O unit 51.

Alternatively, corresponding information on the quality of the transmission line is achieved by monitoring errors in the synchronizing bit of the frame structure. Erroneous bits can be detected as the synchronizing bit normally occurs regularly whereby failure can be detected as a great number of synchronizing bit errors.

When power supply to the modem 22 is switched off, it sends message data in one of the lower-level time intervals C0 ... C8. The message data is received by the control block 59 of the modem unit 21. As a result, the control block then applies a PWR-OFF signal through the I/O interface 51.

A signal 140, 141, 142 intended for line test looping varies from apparatus to apparatus depending on the manufacturer. The signal 141 controls the local loop, the signal 140 controls the remote loop and the signal 142 indicates that the desired loop has been achieved. The signals are either such as in FIG. 2, that is, the ON state of the signal 141 establishes a local loop in the digital network and the signal 142 shifts to the ON state when the network is connected to the loop.

In the system of FIG. 2 the corresponding looping is effected from the slave interface.

The signals may also occur in the other direction, whereby the loopings are activated from the digital network. In the apparatus of the invention the activation of the looping can thus be effected similarly as is typical with modem links. The conversion of the 141 signal to the ON state thereby causes a loop in the modem at the end of the digital network, and the conversion of the signal 140 similarly causes a loop in the slave modem.

In the above description the term modem unit has been used in its widest sense to refer to all devices or means by means of which parallel signals can be converted according to the invention into serial form for the transmission and then returned to parallel form after transmission.

The transmission path may thereby also be an optical fibre and the modem units may contain an optical transmitter and an optical receiver.

In other respect too the FIGURES and the description related to them are only intended to illustrate the present invention In its details the interface unit of the invention may vary within the scope of the attached claims.

What I claim is:

1. A digital data transmission system, comprising:
a data transmission network having a plurality of node stations and interconnecting high-speed trunk lines,
each node station including a plurality of low-speed parallel subscriber interfaces controlled by a network management system, and
a plurality of subscriber stations connectable to the subscriber interfaces of the node stations either directly or through a serial modem link between the respective node station and the subscriber station,
said modem link transferring all data, control and timing signals of the parallel subscriber interface in serial form in both directions, said modem link at the end close to the subscriber station defining a parallel slave interface corresponding to the subscriber interface of the node station, the states of the signals of the parallel slave interface following the states of the signals of the corresponding subscriber interface, and the parallel slave interface being connected to the subscriber station and directly controllable by the network management system through the corresponding subscriber interface.

2. A digital data transmission system, comprising:

a plurality of subscriber stations and a data transmission network having a plurality of node stations and interconnecting high-speed trunk lines; each node station including, a plurality of low-speed parallel subscriber interfaces controlled by a network management system, at least one of said subscriber stations being connected to one of the subscriber interfaces of the node stations by a serial modem link;

said serial modem link including, a first modem associated with said subscriber interface, and a second modem associated with said at least one subscriber station, said modem link transferring all data, control and timing signals of the parallel subscriber interface in serial form in both directions causing the second modem to provide to the subscriber station a parallel slave interface corresponding to the subscriber interface of the node station, the states of the signals of the parallel slave interface following the states of the signals of the subscriber interface, the parallel slave interface being connected to the subscriber station and directly controllable by the network management system through the subscriber interface.

3. A digital data transmission system according to claim 2, wherein the first modem comprises means for sending a line test signal recurrently from the first modem to the second modem, and for generating a line failure alarm at times when the line test signal is not returned by the second modem to the first modem within a predetermined period of time.

4. A digital data transmission system according to claim 3, wherein the first and second modems are operative to time-division multiplex the signals of the parallel subscriber and slave interfaces, respectively, into the serial form, and that both transmission directions include at least one time interval for said line test signal.

5. A system according to claim 2, wherein a condition of the modem link is monitored by monitoring a number of synchronizing bit errors.

6. A system according to claim 2, wherein the condition of the modem link is monitored by monitoring one or more signals transferred from the slave interface to the subscriber interface, whereby the state of the signal is known in normal operation but changes in the event of failure.

7. A digital data transmission system according to any one of the claims 1, 2, 3, 4, 5, or 6 wherein the data transmission network is a time-division network in which the transmission rate of the trunk lines is 2,048 kbit/s and the rate of subscriber interfaces is 1.2 to 19.2 kbit/s.

8. A digital data transmission system according to any one of claims 2, 3, 4, 5 or 6 wherein the data transmission network includes a packet switched network.

* * * * *